(12) United States Patent
Hudson et al.

(10) Patent No.: US 7,845,659 B2
(45) Date of Patent: Dec. 7, 2010

(54) DUMP TRUCK TAG AXLE SUSPENSION CONTROL

(75) Inventors: Herbert D. Hudson, McKinney, TX (US); Thomas N. Chalin, Fairview, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 30 days.

(21) Appl. No.: 12/326,826

(22) Filed: Dec. 2, 2008

(65) Prior Publication Data

US 2010/0133771 A1   Jun. 3, 2010

(51) Int. Cl.
 *B62D 61/12* (2006.01)
(52) U.S. Cl. ...................................... 280/86.5
(58) Field of Classification Search ................ 280/86.5, 280/81.6, 460.1, 683
 See application file for complete search history.

(56) References Cited

U.S. PATENT DOCUMENTS

| | | | |
|---|---|---|---|
| 2,186,996 A | 1/1940 | Short et al. |
| 2,882,067 A | 4/1959 | Gouirand |
| 3,138,392 A | 6/1964 | Holland |
| 3,213,769 A | 10/1965 | Smith |
| 3,275,342 A | 9/1966 | Layton |
| 3,279,824 A | 10/1966 | Brisbin et al. |
| 3,304,101 A | 2/1967 | Layton |
| 3,515,411 A | 6/1970 | Layton |
| 3,542,397 A | 11/1970 | Files |
| 3,704,896 A | 12/1972 | Buelow |
| 3,838,885 A | 10/1974 | Brennan et al. |
| 3,880,393 A | 4/1975 | Watson |
| 3,990,721 A | 11/1976 | Hoffman |
| 4,062,559 A | 12/1977 | Peters |
| 4,157,188 A * | 6/1979 | Sims .......................... 280/81.1 |
| 4,194,854 A | 3/1980 | Mauldin |
| 4,802,690 A | 2/1989 | Raidel |
| 4,880,279 A | 11/1989 | Flesche |
| 5,015,004 A | 5/1991 | Mitchell |
| 5,018,756 A | 5/1991 | Mitchell |
| 5,035,439 A | 7/1991 | Petrillo |
| 5,620,194 A | 4/1997 | Keeler et al. |
| 5,649,719 A | 7/1997 | Wallace et al. |
| 5,718,443 A | 2/1998 | St. Onge |
| 5,823,629 A | 10/1998 | Smith et al. |
| 6,073,946 A | 6/2000 | Richardson |
| 6,116,698 A | 9/2000 | Smith et al. |
| 6,293,570 B1 | 9/2001 | Gottschalk et al. |
| 6,371,227 B2 | 4/2002 | Bartlett |
| 6,557,875 B2 | 5/2003 | Schlosser et al. |
| 6,871,862 B2 | 3/2005 | Chalin |

(Continued)

*Primary Examiner*—Faye M. Fleming
(74) *Attorney, Agent, or Firm*—Smith IP Services (57) ABSTRACT

Dump truck tag axle suspension control. A method of controlling a tag axle suspension includes activating a pusher suspension lift switch; and engaging a steer lock on the tag axle suspension, thereby preventing steering of the tag axle suspension, in response to the lift switch activating step. Another method includes activating a switch to thereby begin operation of a hydraulic pump; and engaging a steer lock of the tag axle suspension, in response to the switch activating step. Yet another method includes applying pressure to a bed lift actuator; sensing the pressure applied to the bed lift actuator; and applying pressure to a tag suspension load actuator, thereby transmitting a load from a frame to a tag axle via the load actuator, in response to the sensed pressure applied to the bed lift actuator reaching a predetermined level.

18 Claims, 7 Drawing Sheets

U.S. PATENT DOCUMENTS

| | | |
|---|---|---|
| 6,899,348 B2 | 5/2005 | Dodd |
| 7,131,652 B2 * | 11/2006 | Ramsey ..................... 280/86.5 |
| 7,281,721 B2 | 10/2007 | Hudson et al. |
| 7,631,881 B2 * | 12/2009 | Broemeling ............. 280/5.521 |
| 2004/0007840 A1 | 1/2004 | Boisture et al. |
| 2005/0093260 A1 | 5/2005 | Trescott |

* cited by examiner

DUMP TRUCK TAG AXLE SUSPENSION CONTROL

BACKGROUND

The present disclosure relates generally to vehicle suspension systems and, in an embodiment described herein, more particularly provides a dump truck tag axle suspension control.

It is known to use a steerable tag axle suspension to enable heavier loads to be transported by a dump truck. In paving operations, the tag axle suspension steering can be locked out when desired, such as when the truck is to be backed up to a paver.

Unfortunately, however, existing control systems for such a tag axle suspension are limited generally to lifting the suspension and engaging a steer lock. Such control systems do not incorporate features specially designed to accommodate paving operations or other types of dumping operations.

Therefore, it may be seen that improvements are needed in the art of controlling dump truck tag axle suspensions.

SUMMARY

In the present specification, a tag axle suspension control system and associated methods are provided which solve at least one problem in the art. One example is described below in which a tag steer lock is engaged in response to activation of a pusher suspension lift switch, activation of a PTO switch is used to maintain engagement of the tag steer lock, and a pressure sensor is used to indicate raising and/or lowering of the bed as a predicate to controlling whether or not pressure is applied to tag load actuators. Another example is described below in which release of pressure from the tag load actuators is delayed until tag air springs have been sufficiently pressurized when the bed is lowered, and release of pressure from the tag air springs is delayed until the tag load actuators have been sufficiently pressurized when the bed is raised.

In one aspect, a method of controlling a tag axle suspension for a dump truck is provided. The method includes the steps of: activating a pusher suspension lift switch, thereby lifting at least one pusher suspension; and engaging a steer lock on the tag axle suspension, thereby preventing steering of the tag axle suspension, in response to the pusher suspension lift switch activating step.

In another aspect, a method of controlling a tag axle suspension for a dump truck includes the steps of: activating a switch to thereby begin operation of a hydraulic pump on the dump truck; and engaging a steer lock of the tag axle suspension, thereby preventing steering of the tag axle, in response to the switch activating step.

In yet another aspect, a method of controlling a tag axle suspension for a dump truck includes the steps of: applying pressure to a bed lift actuator to raise a bed of the dump truck; sensing the pressure applied to the bed lift actuator; and applying hydraulic pressure to a tag suspension load actuator, thereby transmitting a load from a frame of the dump truck to a tag axle via the load actuator, in response to the sensed pressure applied to the bed lift actuator reaching a predetermined threshold level.

The method may also include the steps of: sensing the pressure applied to the tag suspension load actuator; and releasing pressure from a tag suspension air spring when the sensed pressure applied to the tag suspension load actuator reaches a selected level.

The method may include the steps of: relieving pressure from a bed lift actuator to lower a bed of the dump truck; sensing the pressure applied to the bed lift actuator; and applying pressure to a tag suspension air spring when the sensed pressure applied to the bed lift actuator decreases to a predetermined threshold level. The method may also include the steps of: sensing the pressure applied to the tag suspension air spring; and releasing pressure from a tag suspension load actuator when the sensed pressure applied to the tag suspension air spring reaches a selected level.

These and other features, advantages and benefits will become apparent to one of ordinary skill in the art upon careful consideration of the detailed description of representative embodiments below and the accompanying drawings, in which similar elements are indicated in the various figures using the same reference numbers.

DETAILED DESCRIPTION

Figure 1:
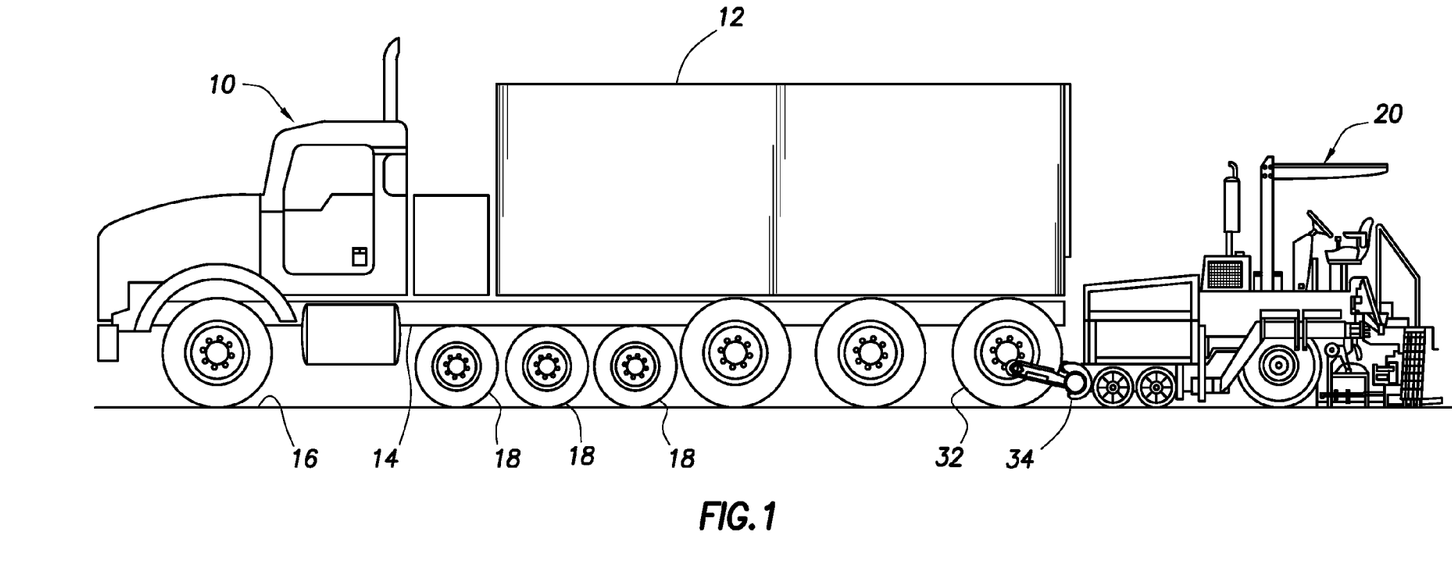
FIG. 1 is a schematic elevational view of a dump truck and a dumping method which embody principles of the present disclosure.

Representatively illustrated in FIG. 1 is a dump truck 10 having a liftable bed 12 for transporting material, such as paving material, aggregate, etc. The bed 12 is supported on a frame 14 which is, in turn, suspended above a road or ground surface 16 by multiple suspensions 18, including a steerable and liftable tag axle suspension 32. The suspension 32 helps to distribute the load transmitted from the truck 10 to the ground surface 16, for example, to comply with government regulations.

As depicted in FIG. 1, a paver 20 is connected to the truck 10 via a truck hitch 34 of the paver. However, it should be clearly understood that it is not necessary for the suspension 32 or the truck 10 to be used in conjunction with a paver or truck hitch in keeping with the principles of this disclosure. Instead, the suspension 32 or truck 10 could be used in conjunction with other types of dumping operations, other equipment, etc.

Figure 2:
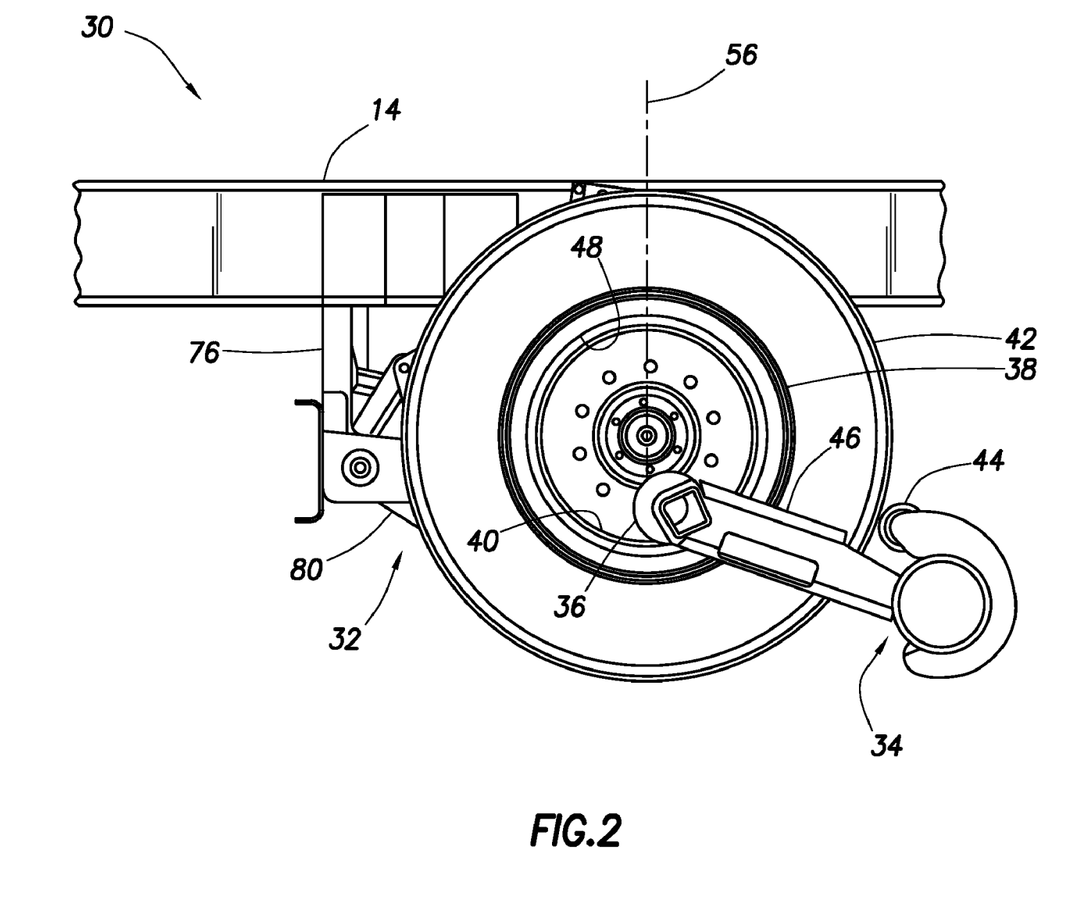
FIG. 2 is an enlarged scale schematic elevational view of a truck/paver connection system and tag axle suspension which may be used in the method of FIG. 1.

Representatively illustrated in FIG. 2 is a system 30 for connecting the dump truck 10 to the paver 20. The system 30 includes the steerable and liftable suspension 32 attached to the frame 14 of the truck 10 as described above. However, it should be clearly understood that the suspension 32 can be used on other vehicles, and on other types of vehicles, in keeping with the principles of this disclosure.

Also depicted in FIG. 2 is the truck hitch 34 of the paver 20. Any paver and/or any truck hitch can be used in place of those shown in FIG. 2, without departing from the principles of this disclosure.

In this view, it may be seen that an engagement device 36 (e.g., a roller) of the truck hitch 34 projects inwardly into an adapter 38 and contacts an outwardly facing concave side 40 of the adapter. This engagement prevents the truck 10 from rolling away from the paver 20 as the paver pushes against a tire 42 using a roller 44. Another roller 46 laterally aligns the truck hitch 34 with the suspension 32 by contacting an outwardly facing flange 48 formed on the adapter 38.

Figure 3:
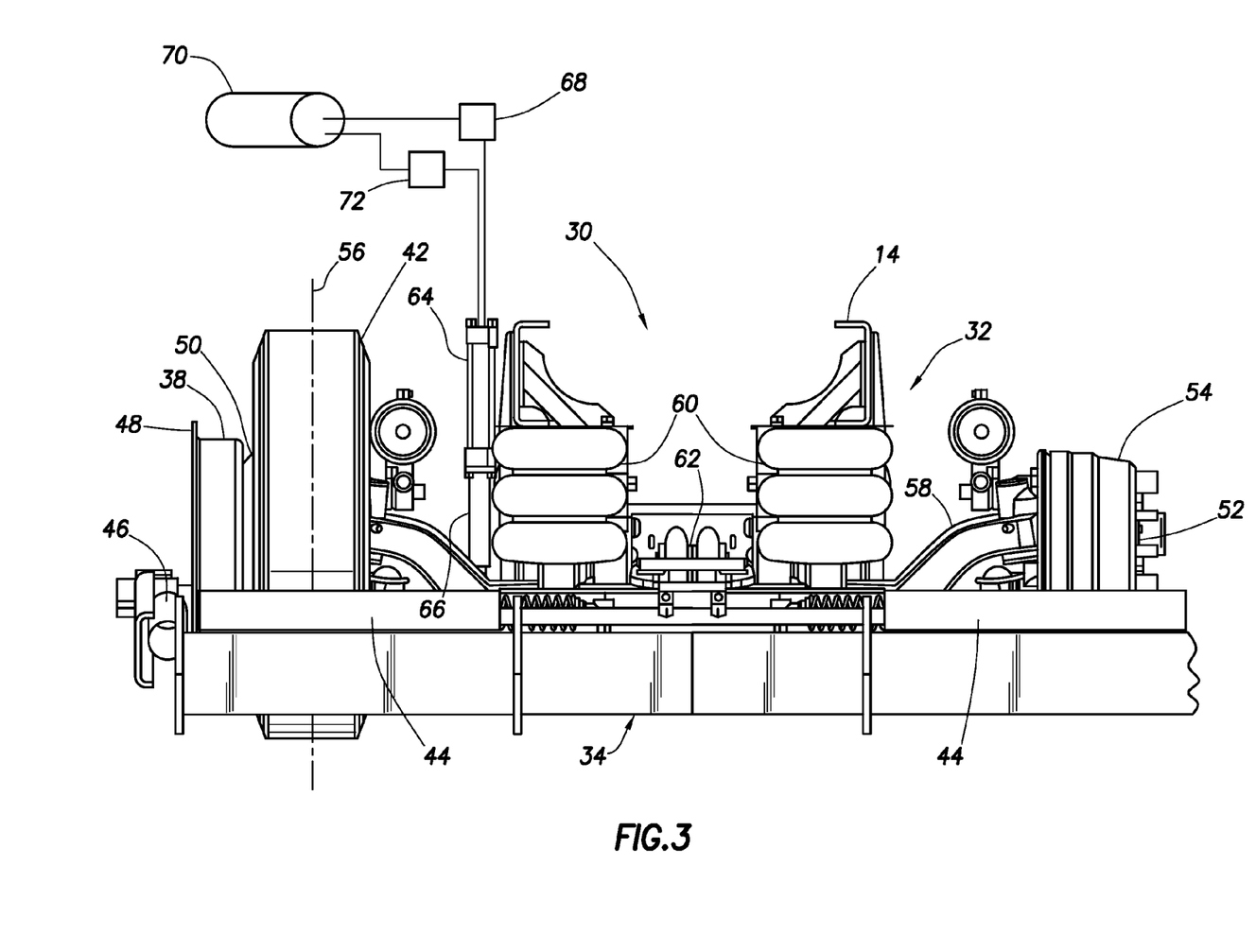
FIG. 3 is a schematic elevational end view of the connection system and tag axle suspension.

The system 30 is depicted from a rear view in FIG. 3. In this view, the general shape of the adapter 38 can be seen. The adapter 38 is outwardly concave and is attached to a wheel 50 on which the tire 42 is mounted. The adapter 38 and wheel 50 are attached to an outer face 52 of a hub 54.

In one feature of the system 30, a vertical centerline 56 of the single tire 42 on each side of the suspension 32 is laterally inwardly positioned relative to the outer face 52 of the hub 54. This reduces end loading moments on an axle 58 of the suspension 32, enabling the axle to have a relatively light weight construction.

Air springs 60 are used in the suspension 32 to suspend the frame 14 above the axle 58. Increased pressure applied to the air springs 60 operates to raise the frame 14 relative to the axle 58. A steering lockout mechanism 62 is used to prevent the suspension 32 from steering (i.e., to prevent the wheels 50 from pivoting relative to the axle 58) while the truck 10 is backing up, or while the paver 20 is pushing the truck.

Note that, although some elements of the suspension 32 are shown in the drawings only on one side of the suspension, it will be readily appreciated that the suspension is the same on each lateral side. Thus, although in FIG. 3 only one adapter 48, wheel 50 and tire 42 are shown on the left side of the suspension 32, in actual practice another adapter, wheel and tire will be attached to the hub 54 on the right side of the suspension.

Another feature of the system 30 visible in FIG. 3 is the hydraulic actuator 64. When the bed 12 is raised, the hydraulic actuator 64 is pressurized, and then pressure in the air springs 60 is reduced, as described more fully below. At this point, a rod 66 of the actuator 64 contacts the axle 58 and transmits a load from the frame 14 to the axle.

The hydraulic actuator 64 prevents the rear end of the truck 10 from raising as the load decreases (i.e., as the material is dumped from the bed 12). For example, when the rod 66 of the actuator 64 contacts the axle 58, it may be at or near the end of its stroke, so that the length of the actuator will not increase appreciably when the load decreases. The hydraulic actuator 64 is compliant and can be used to adjust what proportion of the load is applied to the axle 58, and what proportion of the load is carried by the other suspensions 18.

For example, when the bed 12 is first raised, the load applied to the rear of the frame 14 increases substantially. To prevent damage to the axle 58, a pressure regulator or relief valve 68 may be used to prevent the load transmitted from the frame 14 to the axle 58 from exceeding a predetermined maximum. If the predetermined maximum load is about to be exceeded, the pressure regulator 68 will bleed fluid from the hydraulic actuator 64 to an accumulator 70.

Bleeding fluid from the hydraulic actuator 64 will enable more of the load to be supported by the other suspensions 18. It is conceived that this will only occur in extreme situations, such as when the truck 10 has been overloaded, the material is more dense than expected, etc.

A pump 72 is used to pressurize the hydraulic actuator 64 prior to relieving air pressure from the air springs 60. Preferably, the pump 72 extends the hydraulic actuator 64 to somewhat less than, but very near, its full stroke. As the bed 12 raises and the load then decreases, rise of the frame 14 is limited to the remaining stroke of the actuator 64.

Note that it is not necessary in keeping with the principles of this disclosure for fluid to be bled from the hydraulic actuator 64 by the pressure regulator 68 when the bed 12 is raised or when the load on the suspension system 32 is otherwise increased. For example, fluid may be retained in the actuator 64 to help support the rear of the frame 14. However, this may require use of a higher capacity axle 58 and perhaps a larger actuator 64, etc.

Figure 4:
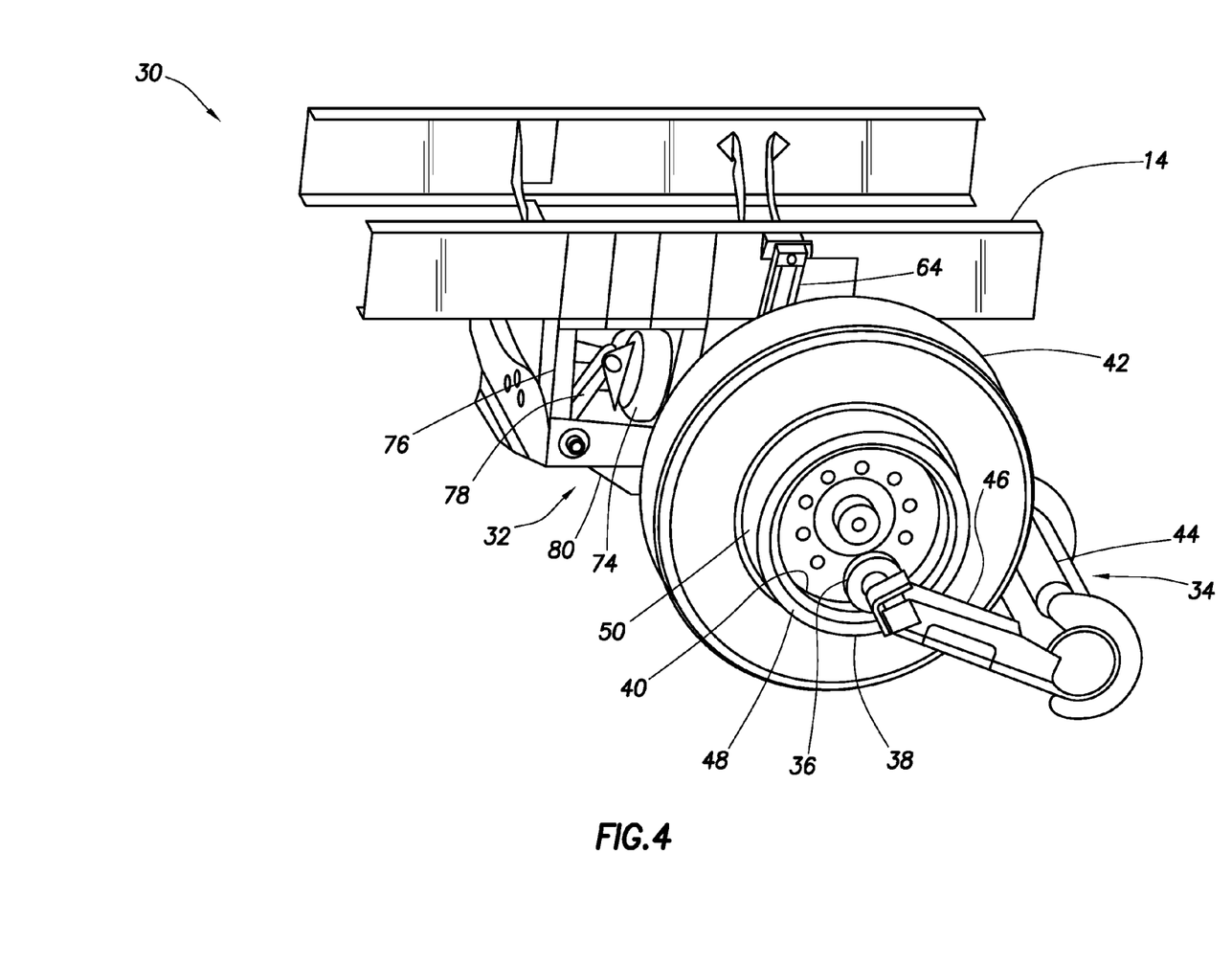
FIG. 4 is a schematic isometric view of the connection system and suspension.

An isometric view of the system 30 is shown in FIG. 4. In this view, a more detailed perspective may be had of the manner in which the truck hitch 34 engages the suspension 32. In addition, the manner in which the axle 58 is lifted using lift bags 74 positioned within hanger brackets 76 attached to the frame 14 can be viewed. When pressurized, the lift bags 74 push against lever arms 78 attached to pivot arms 80 pivotably connected to the hanger brackets 76 and the axle 58.

The system 30 described above is similar in many respects to that described in U.S. Pat. No. 7,281,721, the entire disclosure of which is incorporated herein by this reference. However, the truck 10 described herein includes a control system 90 which is operative to control operation of the suspension 32 based on input from various switches and sensors of the truck, in a manner which enhances safety, efficiency and convenience of operation.

Figure 5:
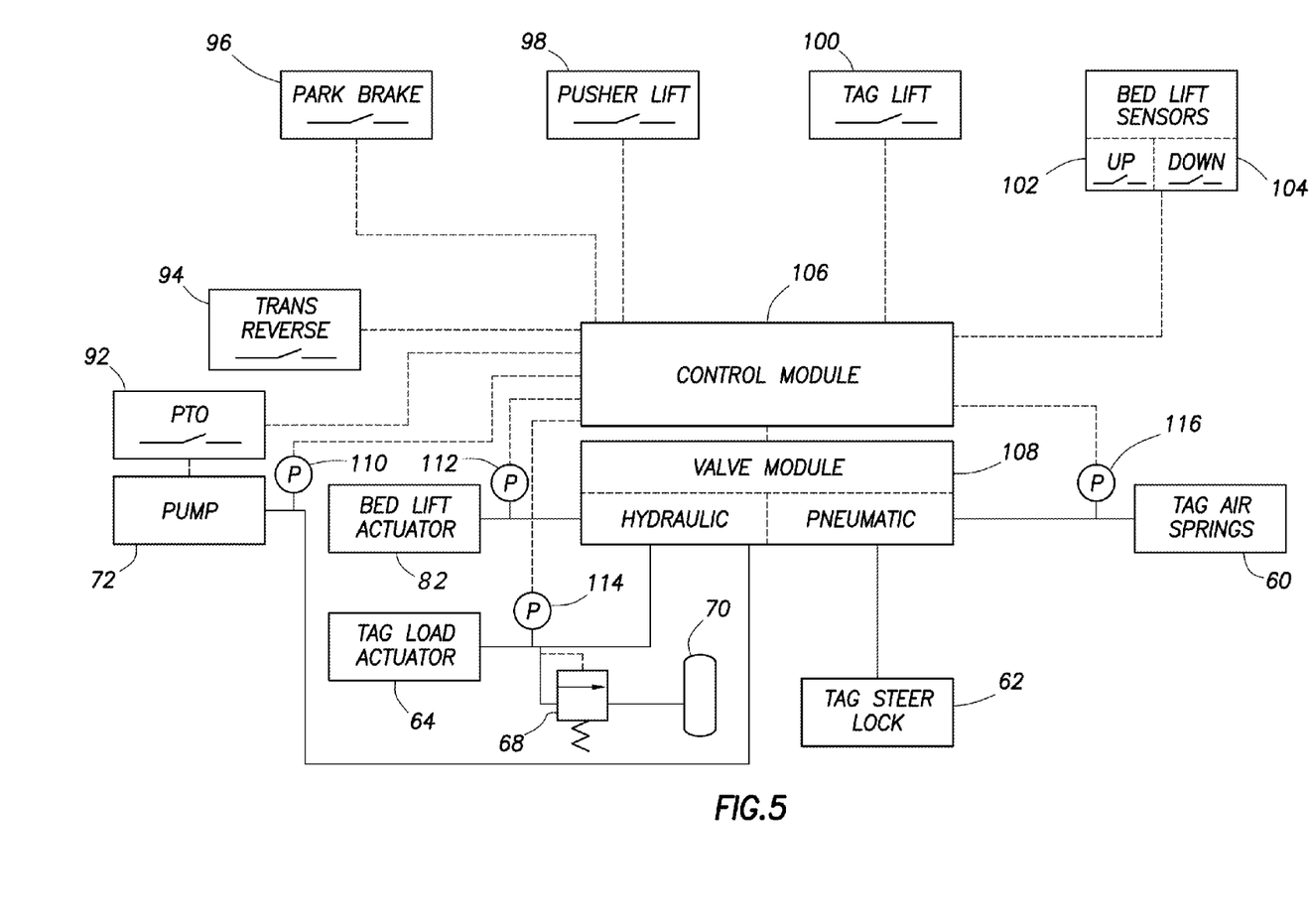
FIG. 5 is a schematic view of a tag axle suspension control system which embodies principles of the present disclosure.

The control system 90 is schematically illustrated in FIG. 5. In this view, it may be seen that switches 92, 94, 96, 98, 100, 102 and 104 are connected to an electronic control module 106. Pressure sensors 110, 112, 114 and 116 are also connected to the control module 106.

The control module 106 is used to control operation of a valve module 108 and may comprise an otherwise conventional programmable logic controller (PLC). The valve module 108 is used to supply hydraulic or pneumatic pressure to, or relieve pressure from, the actuator (also known as the tag load actuator) 64, a hydraulic cylinder or other type of actuator 65 for lifting the bed 12, the steering lockout mechanism 62 and the air springs 60. The valve module 108 may comprise otherwise conventional solenoid- and/or pilot-operated valves.

When activated, the PTO switch 92 causes the pump 72 to be driven by the truck 10 power takeoff (PTO), thereby supplying hydraulic pressure to a hydraulic portion of the valve module 108. The pump 72 may be supplied with hydraulic fluid from the accumulator 70 and/or another hydraulic reservoir on the truck 10. A separate pneumatic pump (not shown) is used to supply air pressure to a pneumatic portion of the valve module 108.

The hydraulic and pneumatic portions of the valve module 108 may be separate, or they may be combined into a single unitary module. Similarly, the control module 106 and the valve module 108 may be separate, or they may be combined into a single unit for convenient incorporation into the truck 10.

The transmission reverse switch 94 is activated when the transmission of the truck 10 is shifted into reverse. Activation of the reverse switch 94 is detected by the control module 106, and in response the control module causes the valve module 108 to activate the tag steer lock 62 (or if the steer lock is already activated, to maintain such activation), thereby preventing the suspension 32 from steering.

Activation of the PTO switch 92 is detected by the control module 106, and in response the control module causes the valve module 108 to activate the tag steer lock 62 (or if the steer lock is already activated, to maintain such activation), thereby preventing the suspension 32 from steering. In typical paving operations, the reverse switch 94 would be activated prior to the PTO switch 92 being activated, but the PTO switch could be activated without the reverse switch being activated (such as, when the paver 20 is pushing the truck 10 with its transmission in neutral).

Activation of the park brake switch 96 is detected by the control module 106, and in response the control module causes the valve module 108 to prevent application of hydraulic pressure to the tag load actuators 64. This is due to the fact that, in paving operations, a loaded bed 12 should not be lifted (thereby applying substantial increased load to the suspension 32) while the park brake is applied. In other types of dumping operations, this feature may not be used.

The pusher lift switch 98 is activated when the pusher suspensions 18 are lifted and the paver 20 is used to push the truck 10 in the paving operation. Activation of the pusher lift switch 98 is detected by the control module 106, and in response the control module causes the valve module 108 to activate the tag steer lock 62 (or if the steer lock is already activated, to maintain such activation), thereby preventing the suspension 32 from steering.

The tag lift switch 100 is activated when the tag suspension 32 is lifted. Activation of the tag lift switch 100 is detected by the control module 106, and in response the control module causes the valve module 108 to prevent application of hydraulic pressure to the tag load actuators 64.

The bed lift switch 102 is activated when the bed 12 is in its raised position, and the bed lift switch 104 is activated when the bed is in its lowered position. The switches 102, 104 could be mechanically-actuated limit switches, magnetically-actuated proximity switches, or any other type of position sensing devices or sensors.

When the control module 106 detects that the bed 12 has begun to lift (e.g., by deactivation of the switch 104), the control module causes the valve module 108 to supply hydraulic pressure to the tag load actuators 64. After a predetermined time delay and/or after the pressure sensor 114 indicates to the control module 106 that sufficient hydraulic pressure has been supplied to the tag load actuators 64, the control module 106 causes the valve module 108 to release air pressure from the tag air springs 60.

When the control module 106 detects that the bed 12 has begun to lower after dumping all or part of the material (e.g., by deactivation of the switch 102), the control module causes the valve module 108 to supply air pressure to the tag air springs 60. After a predetermined time delay and/or after the pressure sensor 116 indicates to the control module 106 that sufficient air pressure has been supplied to the tag air springs 60, the control module 106 causes the valve module 108 to release hydraulic pressure from the tag load actuators 64.

Pressure sensor 110 indicates the hydraulic supply pressure output from the pump 72.

Pressure sensor 112 indicates the pressure applied to the bed lift actuator 82. Instead of, or in addition to, the bed lift sensors 102, 104 described above, the pressure sensor 112 could be used to indicate when the bed 12 is raised (e.g., when the pressure indicated by the sensor 112 is above a certain threshold level), and to indicate when the bed is lowered (e.g., when the pressure indicated by the sensor 112 is below a certain threshold level).

Pressure sensor 114 indicates the pressure applied to the tag load actuators 64. The pressure regulator 68 prevents excessive force from being transmitted to the axle 58 by limiting the maximum pressure applied to the actuators 64, as described above. When the bed 12 starts to rise, an indication from the sensor 114 to the control module 106 that the tag load actuators 64 have been sufficiently pressurized can be used to cause the valve module 108 to release pressure from the tag air springs 60.

Pressure sensor 116 indicates the pressure applied to the tag air springs 60. When the bed 12 has been lowered, an indication from the sensor 116 to the control module 106 that the air springs 60 have been sufficiently pressurized can be used to cause the valve module 108 to release pressure from the tag load actuators 64.

Any of the pressure sensors 110, 112, 114, 116 described above could instead be pressure switches which are set to activate at certain threshold pressure levels. For the purposes of this disclosure, a pressure switch will be considered as an equivalent of a pressure sensor.

Figure 6A:
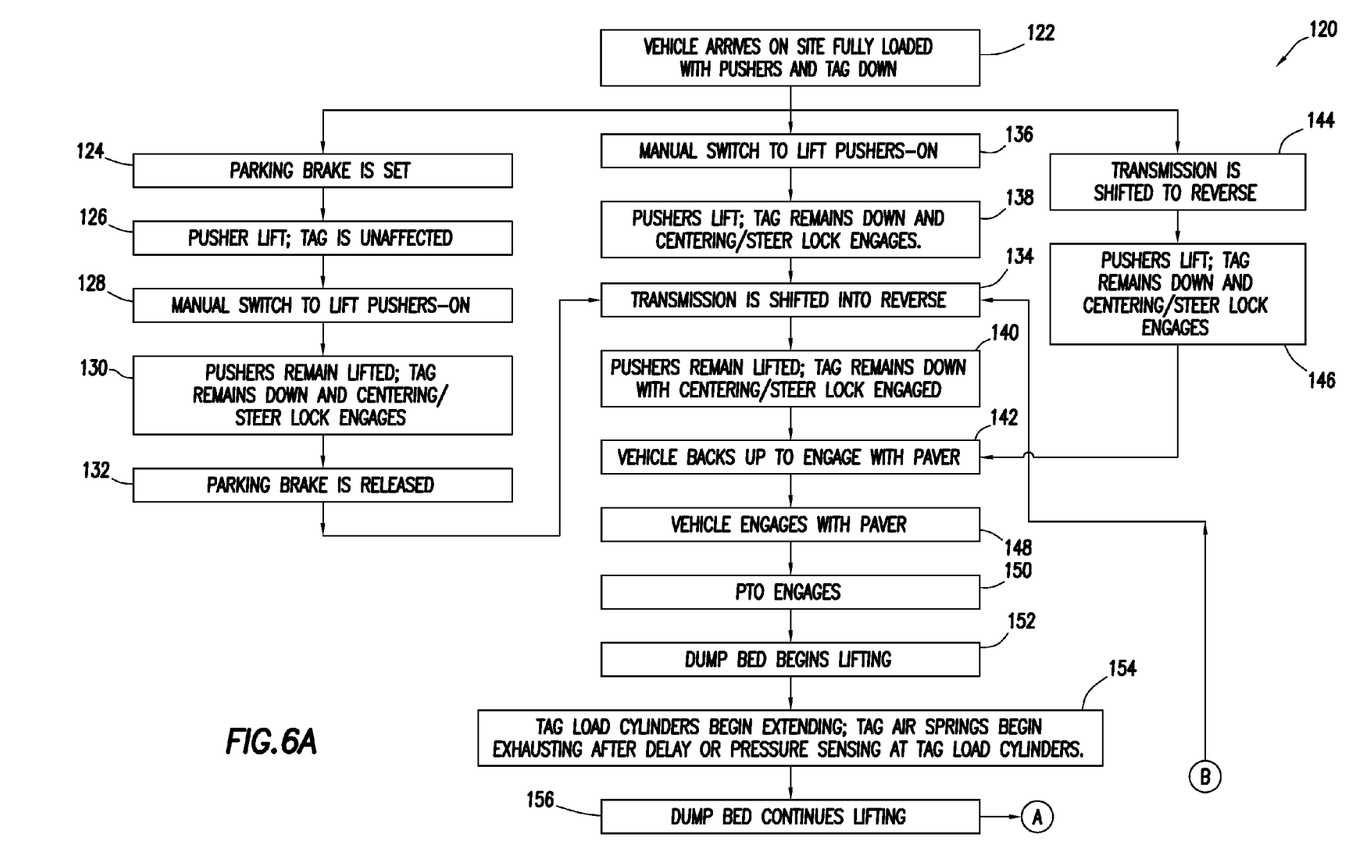
FIGS. 6A & B are a schematic flowchart of the dumping method and tag axle suspension control embodying principles of the present disclosure.
Figure 6B:
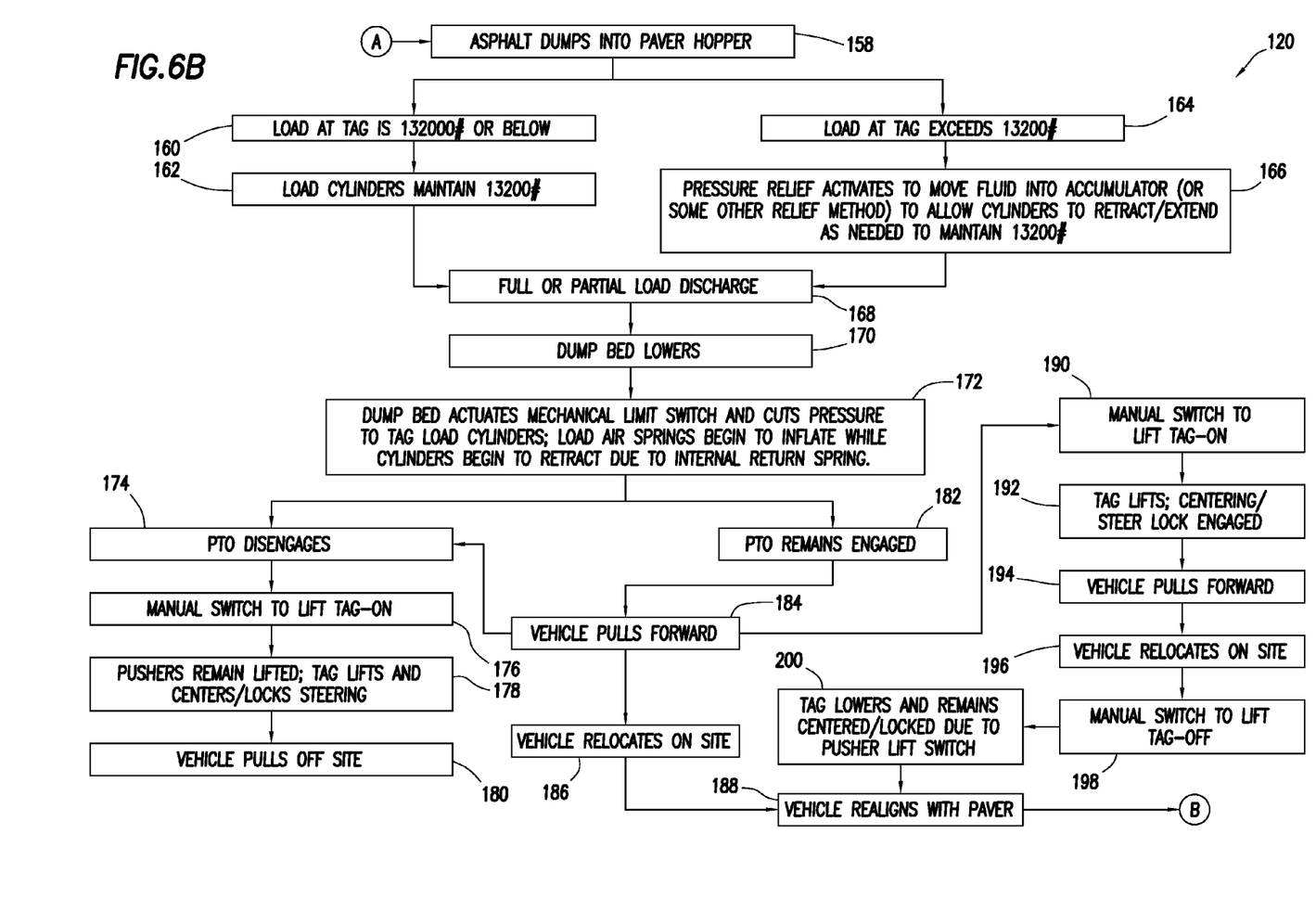

Referring additionally now to FIGS. 6A & B, a method 120 of controlling a dump truck tag axle suspension is representatively illustrated in flowchart form. The method 120 will be described below as if it is performed in conjunction with the truck 10, paver 20, connection system 30, control system 90 and paving operation described above, but it should be understood that the method may be performed in conjunction with other equipment, systems and operations in keeping with the principles of this disclosure.

In step 122, the truck 10 arrives on site with a fully loaded bed 12. The suspensions 18, 32 are all down. The truck 10 arrives equipped with the control system 90 and appropriate elements of the connection system 30 as described above.

In step 124, the park brake on the truck 10 may be set (for example, if there is a wait to dump the material), thereby activating the park brake switch 96. In response, the control system 90 prevents hydraulic pressure from being applied to the tag load actuators 64.

In step 126, the pusher suspensions 18 lift in response to the parking brake being set. The tag suspension 32 remains down.

In step 128, the pusher lift switch 98 is activated. Although the pusher suspensions 18 have already been lifted, it is desirable to manually activate the pusher lift switch 98 at this point to engage the tag steer lock 62 in response, prior to backing up the truck 10. This prevents the tag suspension 32 from steering in reverse. In addition, by activating the pusher lift switch 98, the pusher suspensions 18 are prevented from dropping when the parking brake is released.

In step 130, the tag steer lock 62 is engaged. The pusher suspensions 18 remain lifted, and the tag suspension 32 remains down.

In step 132, the parking brake is released. The pusher suspensions 18 remain lifted, and the tag suspension 32 remains down.

In step 134, the transmission is shifted into reverse, thereby activating the reverse switch 94. If not already engaged, the tag steer lock 62 is engaged in response to the reverse switch 94 being activated.

An alternative to steps 124-132 described above is applicable if, for example, no wait is involved, or the parking brake is not otherwise set prior to backing the truck 10 up to the paver 20. In that case, upon arrival on site, the pusher lift switch 98 would be activated as indicated in step 136, and the tag steer lock 62 would be engaged as indicated in step 138, prior to shifting the transmission into reverse as indicated in step 134. Steps 136 and 138 are substantially similar to steps 128 and 130 described above.

After the transmission is shifted into reverse in step 134, the pusher suspensions 18 remain lifted and the tag suspension 32 remains down with the steer lock 62 engaged, as indicated in step 140. In step 142, the truck 10 then backs up to engage the paver 20.

An alternative to steps 124-140 described above is applicable if, for example, the truck 10 is not equipped with a manual pusher suspension lift switch 98. In that case, after arriving on site, the transmission would be shifted into reverse as indicated in step 144, in order to back up to the paver 20. If a wait is involved, the park brake may be set and then released as in steps 124 and 132 described above, in which case the control system 90 prevents hydraulic pressure from being applied to the tag load actuators 64 while the park brake switch 96 is activated.

Activation of the reverse switch 94 causes the pusher suspensions 18 to lift, as indicated in step 146. The tag suspension 32 remains down, and the tag steer lock 62 is engaged (i.e., pneumatic pressure is maintained in the tag air springs 60, and pneumatic pressure is supplied to the tag steer lock 62, via the valve module 108). The truck 10 then backs up to engage the paver 20 as indicated in step 142.

In step 148, the truck 10 engages the paver 20. The connection system 30 described above is used to couple the truck hitch 34 of the paver 20 to the truck 10, at which point the paver can push the truck forward while the material is dumped from the bed 12 into the paver hopper. After the connection operation, the truck transmission may be shifted into neutral, but it is preferred that the PTO be engaged (described for step 150 below) prior to the transmission being shifted into neutral, in order to maintain the tag steer lock 62 engaged at this point.

In step 150, the truck PTO is engaged, thereby activating the PTO switch 92. Activation of the PTO switch causes the tag steer lock 62 to be engaged (or if the steer lock is already engaged, to maintain such engagement), thereby preventing the suspension 32 from steering. Note that, at this point the truck transmission may be in neutral, in which case the reverse switch 94 would not be activated, although it is preferred for the transmission to be shifted to neutral after the PTO is engaged.

In step 152, hydraulic pressure is applied to the bed lift actuator 82 to lift the bed 12. An indication that the bed 12 has begun to lift is provided to the control module 106 by the sensor or switch 104 (i.e., indicating that the bed is no longer in its down position), and/or the pressure sensor 112 which senses a pressure greater than a predetermined threshold level in the lift actuator 82.

In response to lifting of the bed 12, hydraulic pressure is supplied to the tag load actuators 64, and then air pressure is released from the tag air springs 60, as indicated in step 154. This step may be initiated immediately upon the control module 106 receiving an indication that the bed 12 has begun to lift, or it may be delayed until the bed 12 has reached its fully raised position (as indicated by activation of the lift sensor/switch 102). The delay alternative may be useful if the hydraulic output of the pump 72 is insufficient to simultaneously extend both the lift actuator 82 and the tag load actuators 64.

Air pressure is exhausted from the tag air springs 60 after the tag load actuators 64 have been extended. A time delay (e.g., 5-6 seconds) counted from the initiation of supply of hydraulic pressure to the tag load actuators 64 may be used, or the pressure sensor 114 could indicate when the tag load actuators have been sufficiently pressurized, at which time the valve module 108 would release air pressure from the air springs 60.

In step 156, the bed 12 continues to lift, and in step 158, the material is dumped in the paver hopper. As long as the load applied to the tag axle 58 is at or below a predetermined level (e.g., 13,200 pounds in this example), hydraulic pressure is maintained on the tag load actuators 64, as indicated in steps 160 and 162.

An indication of the load applied to the tag axle 58 can be supplied to the control module 106 via the pressure sensor 114, since the pressure in the tag load actuators 64 should be directly related to the load applied to the tag axle 58. In that case, the control module 106 could cause the valve module 108 to appropriately regulate the pressure applied to the tag load actuators 64 to maintain the load applied to the tag axle 58 at or below the predetermined level. Alternatively, the pressure regulator 68 may be used to relieve pressure from the tag load actuators 64 to prevent the load applied to the tag axle 58 from exceeding the predetermined level, as described above and indicated in steps 164 and 166.

In step 168, the material is fully or partially dumped from the bed 12 and, in step 170, the bed is lowered. An indication that the bed 12 has lowered is provided to the control module 106 by the sensor or switch 104 (i.e., indicating that the bed is in its down position), and/or the pressure sensor 112 which senses a pressure less than a predetermined threshold level in the lift actuator 82.

In response to lowering of the bed 12, air pressure is supplied to the tag air springs 60, and then hydraulic pressure is released from the tag load actuators 64, as indicated in step 172. This step may be initiated immediately upon the control module 106 receiving an indication that the bed 12 has begun to lower (as indicated by deactivation of the sensor/switch 102), or it may be delayed until the bed 12 has reached its fully lowered position (as indicated by activation of the sensor/switch 104 and/or by the pressure sensor 112).

Hydraulic pressure is released from the tag load actuators 64 after the tag air springs 60 have been pressurized. A time delay (e.g., 5-6 seconds) counted from the initiation of supply of pneumatic pressure to the tag air springs 60 may be used, or the pressure sensor 116 could indicate when the tag air springs have been sufficiently pressurized, at which time the valve module 108 would release hydraulic pressure from the tag load actuators 64.

If the dumping operation is concluded, then the PTO is disengaged as indicated in step 174, thereby deactivating the PTO switch 92. The transmission may remain in neutral while the truck 10 is disconnected from the paver 20. The tag suspension 32 is lifted by activating the tag lift switch 100 as indicated in step 176.

The pusher suspensions 18 remain lifted, the tag suspension 32 lifts, and the tag steer lock 62 is engaged as indicated in step 178. The truck 10 can now be driven off site as indicated in step 180.

If the dumping operation is not concluded, for example, if the reason for lowering the bed 12 is to allow the truck 10 to realign with the paver 20, then the truck may be disconnected from the paver while the PTO remains engaged as indicated in step 182. Continued activation of the PTO switch 92 would cause the tag steer lock 62 to remain engaged.

The truck 10 may then be driven forward as indicated in step 184, relocated as indicated in step 186, and realigned with the paver 20 as indicated in step 188. The operation then returns to step 134, in which the transmission is shifted into reverse, so that the truck 10 can back up and be reconnected with the paver 20 to resume the dumping operation.

If it is desired to lift the tag suspension 32 while relocating the truck 10 to align it with the paver 20, then the tag lift switch 100 may be activated as indicated in step 190. In step 192, the tag suspension 32 lifts and the tag steer lock 62 is engaged. The truck 10 can now pull forward and relocate on site as indicated in steps 194 and 196.

The tag suspension 32 can then be lowered by deactivating the tag lift switch 100 as indicated in step 198. The tag suspension 32 lowers as indicated in step 200. The tag steer lock 62 remains engaged as long as the pusher suspension lift switch 98 remains activated.

The truck 10 can then realign with the paver 20 as indicated in step 188, and the operation returns to step 134, in which the transmission is shifted into reverse, so that the truck 10 can back up and be reconnected with the paver 20 to resume the dumping operation.

It may now be fully appreciated that the above description provides several improvements to the art of controlling a tag axle suspension in a dumping operation. Among these improvements are the engagement of the tag steer lock 62 in response to activation of the pusher suspension lift switch 98, use of activation of the PTO switch 92 to maintain engagement of the tag steer lock, and use of the pressure sensor 112 to indicate raising and/or lowering of the bed 12 as a predicate to controlling whether or not pressure is applied to the tag load actuators 64. Other improvements include delaying release of pressure from the tag load actuators 64 until the tag air springs 60 have been sufficiently pressurized when the bed 12 is lowered, and delaying release of pressure from the tag air springs until the tag load actuators have been sufficiently pressurized when the bed is raised.

The above disclosure describes a method of controlling a tag axle suspension 32 for a dump truck 10, in which the method includes the steps of: activating a pusher suspension lift switch 98, thereby lifting at least one pusher suspension 18; and engaging a steer lock 62 on the tag axle suspension 32, thereby preventing steering of the tag axle suspension 32, in response to the pusher suspension lift switch activating step.

The method may also include the step of engaging a power takeoff 92 of the dump truck 10 to thereby operate a hydraulic pump 72. The power takeoff engaging step may cause the steer lock 62 to remain engaged if a transmission of the dump truck 10 is shifted out of reverse.

The method may also include the steps of: applying pressure to a bed lift actuator 82 to raise a bed 12 of the dump truck 10; sensing the pressure applied to the bed lift actuator 82; and applying hydraulic pressure to a tag suspension load actuator 64, thereby transmitting a load from a frame 14 of the dump truck 10 to a tag axle 58 via the load actuator 64, when the sensed pressure applied to the bed lift actuator 82 reaches a predetermined threshold level. The method may also include the steps of: sensing the pressure applied to the tag suspension load actuator 64; and releasing pressure from a tag suspension air spring 60 when the sensed pressure applied to the tag suspension load actuator 64 reaches a selected level.

The method may include the steps of: relieving pressure from a bed lift actuator 82 to lower a bed 12 of the dump truck 10; sensing the pressure applied to the bed lift actuator 82; and applying pressure to a tag suspension air spring 60 when the sensed pressure applied to the bed lift actuator 82 decreases to a predetermined threshold level. The method may also include the steps of: sensing the pressure applied to the tag suspension air spring 60; and releasing pressure from a tag suspension load actuator 64 when the sensed pressure applied to the tag suspension air spring 60 reaches a selected level.

Also described in the above disclosure is a method of controlling a tag axle suspension 32 for a dump truck 10, with the method including the steps of: activating a switch 92 to thereby begin operation of a hydraulic pump 72 on the dump truck 10; and engaging a steer lock 62 of the tag axle suspension 32, thereby preventing steering of a tag axle 58, in response to the switch activating step.

The method may also include the step of shifting a transmission of the truck 10 out of reverse. The steer lock 32 remains engaged while the transmission is shifted out of reverse.

Also provided by the above disclosure is a method of controlling a tag axle suspension 32 for a dump truck 10, with the method including the steps of: applying pressure to a bed lift actuator 82 to raise a bed 12 of the dump truck 10; sensing the pressure applied to the bed lift actuator 82; and applying hydraulic pressure to a tag suspension load actuator 64, thereby transmitting a load from a frame 14 of the dump truck 10 to a tag axle 32 via the load actuator 64, in response to the sensed pressure applied to the bed lift actuator 82 reaching a predetermined threshold level.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of controlling a tag axle suspension for a dump truck, the method comprising the steps of:
    activating a pusher suspension lift switch, thereby lifting at least one pusher suspension;
    engaging a steer lock on the tag axle suspension, thereby preventing steering of the tag axle suspension, in response to the pusher suspension lift switch activating step;
    relieving pressure from a bed lift actuator to lower a bed of the dump truck;
    sensing the pressure applied to the bed lift actuator; and
    applying pressure to a tag suspension air spring when the sensed pressure applied to the bed lift actuator decreases to a predetermined threshold level.

2. The method of claim 1, further comprising the step of engaging a power takeoff of the dump truck to thereby operate a hydraulic pump, and wherein the power takeoff engaging step causes the steer lock to remain engaged if a transmission of the dump truck is shifted out of reverse.

3. The method of claim 1, further comprising the steps of:
    applying pressure to a bed lift actuator to raise a bed of the dump truck;
    sensing the pressure applied to the bed lift actuator; and
    applying hydraulic pressure to a tag suspension load actuator, thereby transmitting a load from a frame of the dump truck to a tag axle via the load actuator, when the sensed pressure applied to the bed lift actuator reaches a predetermined threshold level.

4. The method of claim 3, further comprising the steps of:
    sensing the pressure applied to the tag suspension load actuator; and
    releasing pressure from a tag suspension air spring when the sensed pressure applied to the tag suspension load actuator reaches a selected level.

5. The method of claim 1, further comprising the steps of:
    sensing the pressure applied to the tag suspension air spring; and
    releasing pressure from a tag suspension load actuator when the sensed pressure applied to the tag suspension air spring reaches a selected level.

6. A method of controlling a tag axle suspension for a dump truck, the method comprising the steps of:
    activating a switch to thereby begin operation of a hydraulic pump on the dump truck; and
    engaging a steer lock of the tag axle suspension, thereby preventing steering of a tag axle, in response to the switch activating step.

7. The method of claim 6, further comprising the step of shifting a transmission of the truck out of reverse, and wherein the steer lock remains engaged while the transmission is shifted out of reverse.

8. The method of claim 6, further comprising the step of activating a pusher suspension lift switch, thereby lifting at least one pusher suspension, and wherein the lift switch activating step causes the steer lock to remain engaged if a transmission of the dump truck is shifted out of reverse.

9. The method of claim 6, further comprising the steps of:
applying pressure to a bed lift actuator to raise a bed of the dump truck;
sensing the pressure applied to the bed lift actuator; and
applying hydraulic pressure to a tag suspension load actuator, thereby transmitting a load from a frame of the dump truck to a tag axle via the load actuator, when the sensed pressure applied to the bed lift actuator reaches a predetermined threshold level.

10. The method of claim 9, further comprising the steps of:
sensing the pressure applied to the tag suspension load actuator; and
releasing pressure from a tag suspension air spring when the sensed pressure applied to the tag suspension load actuator reaches a selected level.

11. The method of claim 6, further comprising the steps of:
relieving pressure from a bed lift actuator to lower a bed of the dump truck;
sensing the pressure applied to the bed lift actuator; and
applying pressure to a tag suspension air spring when the sensed pressure applied to the bed lift actuator decreases to a predetermined threshold level.

12. The method of claim 11, further comprising the steps of:
sensing the pressure applied to the tag suspension air spring; and
releasing pressure from a tag suspension load actuator when the sensed pressure applied to the tag suspension air spring reaches a selected level.

13. A method of controlling a tag axle suspension for a dump truck, the method comprising the steps of:
applying pressure to a bed lift actuator to raise a bed of the dump truck;
sensing the pressure applied to the bed lift actuator; and
applying hydraulic pressure to a tag suspension load actuator, thereby transmitting a load from a frame of the dump truck to a tag axle via the load actuator, in response to the sensed pressure applied to the bed lift actuator reaching a predetermined threshold level.

14. The method of claim 13, further comprising the steps of:
sensing the pressure applied to the tag suspension load actuator; and
releasing pressure from a tag suspension air spring when the sensed pressure applied to the tag suspension load actuator reaches a selected level.

15. The method of claim 13, further comprising the steps of:
relieving pressure from the bed lift actuator to lower the bed of the dump truck; and
applying pressure to a tag suspension air spring when the sensed pressure applied to the bed lift actuator decreases to a predetermined threshold level.

16. The method of claim 15, further comprising the steps of:
sensing the pressure applied to the tag suspension air spring; and
releasing pressure from the tag suspension load actuator when the sensed pressure applied to the tag suspension air spring reaches a selected level.

17. The method of claim 13, further comprising the steps of:
activating a pusher suspension lift switch, thereby lifting at least one pusher suspension; and
engaging a steer lock on the tag axle suspension, thereby preventing steering of the tag axle suspension, in response to the pusher suspension lift switch activating step.

18. The method of claim 17, further comprising the step of engaging a power takeoff of the dump truck to thereby operate a hydraulic pump, and wherein the power takeoff engaging step causes the steer lock to remain engaged if a transmission of the dump truck is shifted out of reverse.

\* \* \* \* \*